(12) United States Patent
Player (10) Patent No.: US 7,072,361 B1
(45) Date of Patent: Jul. 4, 2006

(54) SYSTEM AND METHOD FOR THE TRANSPORT OF BACKWARDS INFORMATION BETWEEN SIMPLEX DEVICES

(75) Inventor: Andrew Mark Player, Salem, NH (US)

(73) Assignee: Applied Micro Circuits Corporation, San Diego, CA (US)

( * ) Notice: Subject to any disclaimer, the term of this patent is extended or adjusted under 35 U.S.C. 154(b) by 974 days.

(21) Appl. No.: 10/094,259

(22) Filed: Mar. 8, 2002

(51) Int. Cl.
*H04J 3/16* (2006.01)
*H04J 3/22* (2006.01)

(52) U.S. Cl. .............. 370/470; 370/539; 370/392; 370/472; 370/474

(58) Field of Classification Search ............... None
See application file for complete search history.

(56) References Cited

U.S. PATENT DOCUMENTS 6,819,686 B1 * 11/2004 Frannhagen et al. ........ 370/535
6,961,350 B1 * 11/2005 Bendak et al. .............. 370/474
2002/0172225 A1 * 11/2002 Ang et al. ................... 370/503

* cited by examiner

*Primary Examiner*—Huy D. Vu
*Assistant Examiner*—Raj Jain
(74) *Attorney, Agent, or Firm*—Law Office of Gerald Maliszewski; Gerald Maliszewski (57) ABSTRACT

A system and method are provided for transporting backward information in a digital wrapper format network of connected simplex devices. The system comprises a first simplex processor receiving downstream messages with overhead bytes. The first simplex processor selectively replaces overhead bytes with calculated overhead bytes and supplies the calculated overhead bytes. The system further comprises a buffer receiving the calculated overhead bytes from the first simplex processor and supplying the calculated overhead bytes. A second simplex processor accepts the calculated overhead bytes from the buffer and supplies an upstream message including the calculated overhead bytes. The first simplex processor receives messages in a frame format with an overhead section, drops the overhead section, and selectively reads backward message monitor bytes in the dropped overhead section to determine if upstream communication nodes are receiving transmitted messages.

11 Claims, 6 Drawing Sheets

SYSTEM AND METHOD FOR THE TRANSPORT OF BACKWARDS INFORMATION BETWEEN SIMPLEX DEVICES

BACKGROUND OF THE INVENTION

1. Field of the Invention

This invention generally relates to digital wrapper format communications and, more particularly, to a system and method for transporting backwards information between simplex devices in a network using a digital wrapper format.

2. Description of the Related Art

Digitally wrapped, or multidimensional frame structure communications generally describe information that is sent as a packet without overhead to control the communication process. The packet can also include forward error correction (FEC) to recover the payload if the communication is degraded. One example of such communication is the synchronous optical network (SONET). Another example is the digital wrapper format often used in transporting SONET communications.

There are many framed communication protocols in use, depending on the service provider and the equipment being used. These differences in protocols can be arbitrary or supported by an underlying function. Frame synchronization and overhead placement are sometimes standardized by governing organizations such as the ITU-T. At the time of this writing, the ITU-T standard for the digital wrapper format is G.709.

Conventionally, the interface node must include two sets of equipment. A communication in the first protocol is received at the first set of equipment (processor). The message is unwrapped and the payload recovered. Synchronization protocols must be established between the equipment set and a second set of equipment (processor). The payload can then be received at the second equipment set and repackaged for transmission in a different protocol.

Systems that are built to be compliant to G.709 must communicate certain error fields upstream in the network. These error fields are transmitted in the allotted backward fields in the overhead part of the data stream. These backward fields are processed by the receiving nodes to determine the health of the downstream transmission link. As of this writing, the backward error fields defined in G.709 that can be used with this invention are the Backward Error Indication (BEI), the Backward Defect Indication (BDI), and the backward field of the Fault Type and Fault Location (FTFL) message. However, other backward fields could be added to the G.709 standard.

Figure 1:
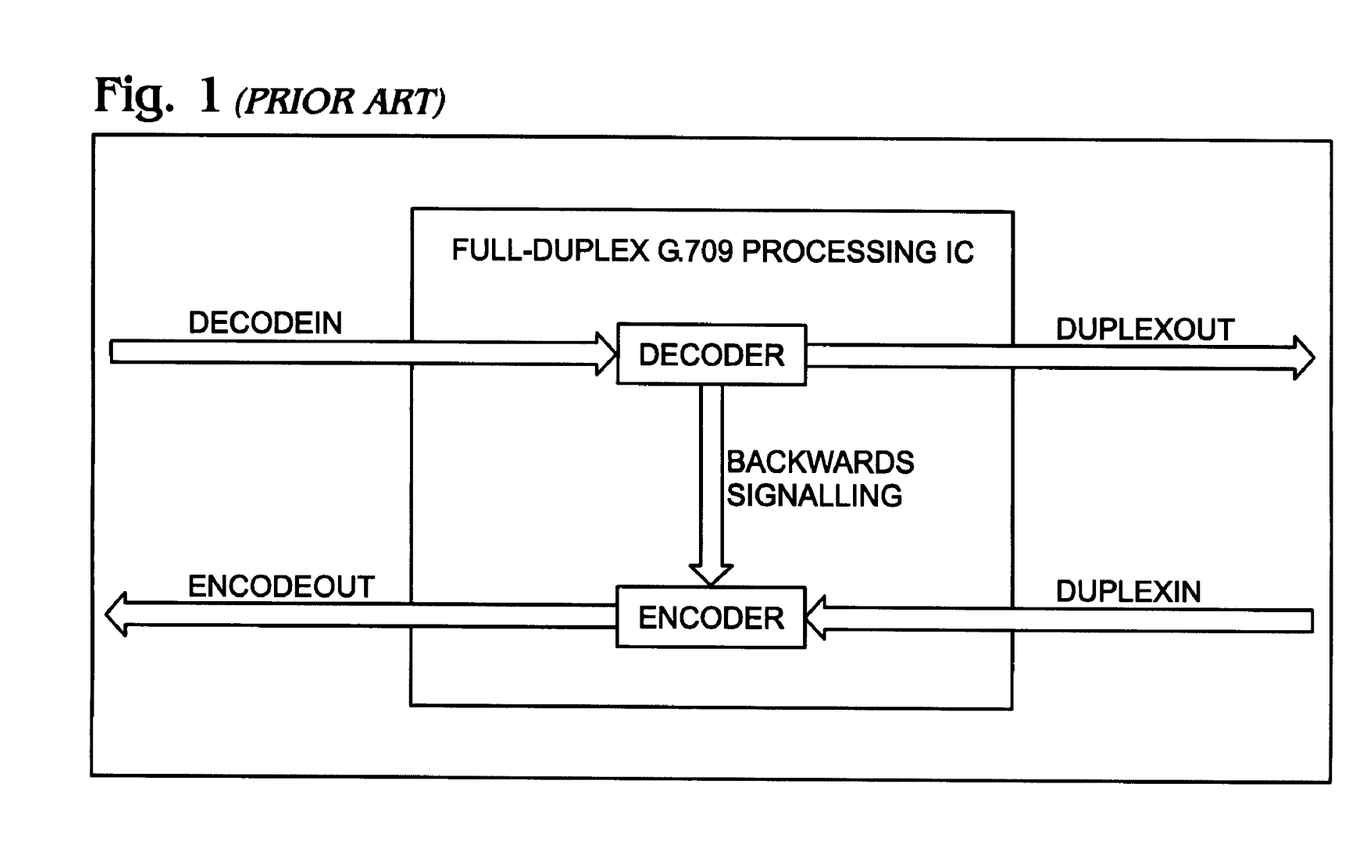
FIG. 1 is a schematic block diagram of a full-duplex processing node (prior art).

FIG. 1 is a schematic block diagram of a full-duplex processing node (prior art). When a G.709 compliant full-duplex processing node is built up from a single integrated circuit device, all the communication of the backward information takes place within that integrated circuit. In this type of device, the injection of the backward errors from one direction of the network to the other can be accomplished without any user intervention.

However, G.709 compliant full-duplex processing nodes can also be built up from two simplex integrated circuit devices, in which case it is no longer possible to communicate the backwards information within a single integrated circuit. This is a problem that must be solved with interface circuitry that is complex, costly, and cumbersome.

It would be advantageous if the backward information received in the dropped overhead data stream by a first simplex device could be replaced with the calculated backward error to be sent upstream by a second simplex device.

It would be advantageous if the above-mentioned simplex devices could be simply interfaced. It would also be advantageous if the calculated backwards errors could be sent in real-time.

SUMMARY OF THE INVENTION

It is extremely difficult to transfer the information in real-time from the forward to the backward direction using conventional G.709 compliant systems built from two simplex integrated circuit devices. Devices designed to receive a G.709 data stream do not normally need to access the received backward fields, because they are used for performance monitoring statistics by the receiving integrated circuit, and then discarded. Thus, by overwriting the received backward fields in the dropped overhead data stream, a system can be built to transfer the backward information in real-time with no intervention from user software, and without the loss of any needed information.

The present invention defines an architecture for the dropping of calculated overhead bytes in place of the received overhead bytes to facilitate the real-time communication of errors to the remote (backward) interface in a full-duplex system consisting of two simplex integrated circuits that are compliant to the International Telecommunications Union ITU-T G.709 (G.709) specification.

Accordingly, a system is provided for transporting backward information in a digital wrapper format network of connected simplex devices. The system comprises a first simplex processor receiving downstream messages with overhead bytes. The first simplex processor selectively replaces overhead bytes with calculated overhead bytes and supplies the calculated overhead bytes. The system further comprises a buffer receiving the calculated overhead bytes from the first simplex processor and supplying the calculated overhead bytes. A second simplex processor accepts the calculated overhead bytes from the buffer and supplies an upstream message including the calculated overhead bytes.

The first simplex processor receives messages in a frame format with a payload and an overhead section, drops the overhead section, and selectively reads backward message monitor bytes in the dropped overhead section to determine if an upstream communications node is receiving transmitted messages. The first simplex processor determines errors in the downstream messages, expresses the errors in the form of transmit overhead bytes, and selectively overwrites the backward message monitor bytes in the overhead section with transmit monitor overhead bytes.

Since the system has a buffer, the first and second simplex devices need not be synchronized. The first simplex processor supplies write timing signals and the second simplex processor supplies read timing signals. Thus, the buffer is written with the transmit monitor overhead bytes in response to write timing signals from the first simplex processor, and the transmit overhead bytes are read from the buffer in response to read timing signals from the second simplex device.

When the first simplex processor receives a G.709 format message with 64 overhead bytes per frame, it reads the tandem connection monitoring (TCM), path monitoring (PM), and section monitoring (SM) overhead bytes, and selectively overwrites the TCM, PM, and SM overhead bytes. The second simplex processor supplies a G.709 upstream message with the overwritten TCM, PM, and SM overhead bytes.

Additional details of the above-described system, and a method for transporting backward information in a digital wrapper format network, are provided below.

DETAILED DESCRIPTION OF THE PREFERRED EMBODIMENTS

Figure 2:
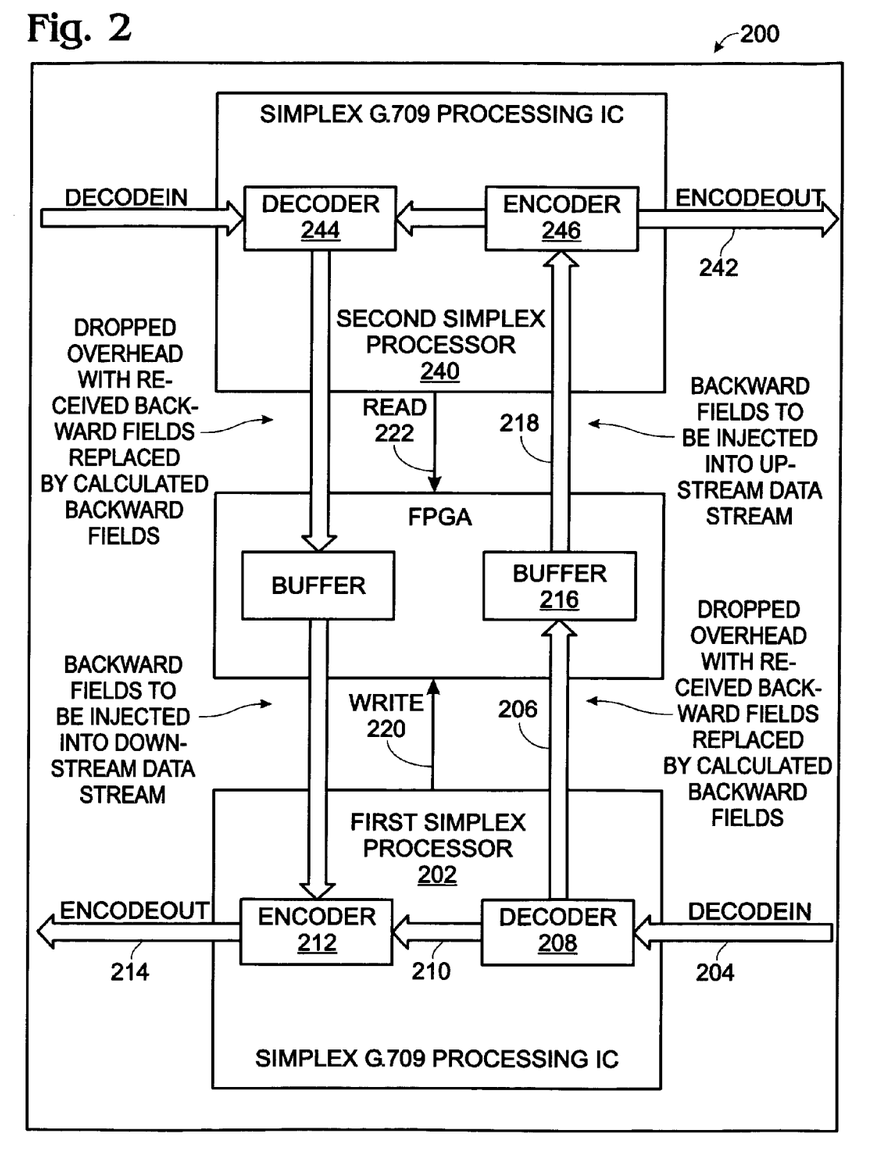
FIG. 2 is a schematic block diagram of the present invention system for transporting backward information in a digital wrapper format network.

FIG. 2 is a schematic block diagram of the present invention system for transporting backward information in a digital wrapper format network. The system 200 comprises a simplex processor 202 having an input on line 204 for receiving downstream messages with overhead bytes. The simplex processor 202 selectively replaces overhead bytes with calculated overhead bytes, and supplies the calculated overhead bytes at an output on line 206. Typically, the receive messages are coded for forward error correction (FEC) and the simplex processor 202 includes a decoder 208 to decode the FEC. The decoded message is supplied on line 210, and FEC coded again by encoder 212, before the message is retransmitted on line 214. Sections of the received message overhead section may be replaced or modified before the message is encoded.

A buffer 216 has an input on line 206 for receiving the calculated overhead bytes and an output on line 218 for supplying the calculated overhead bytes for upstream messages.

Figure 3A:
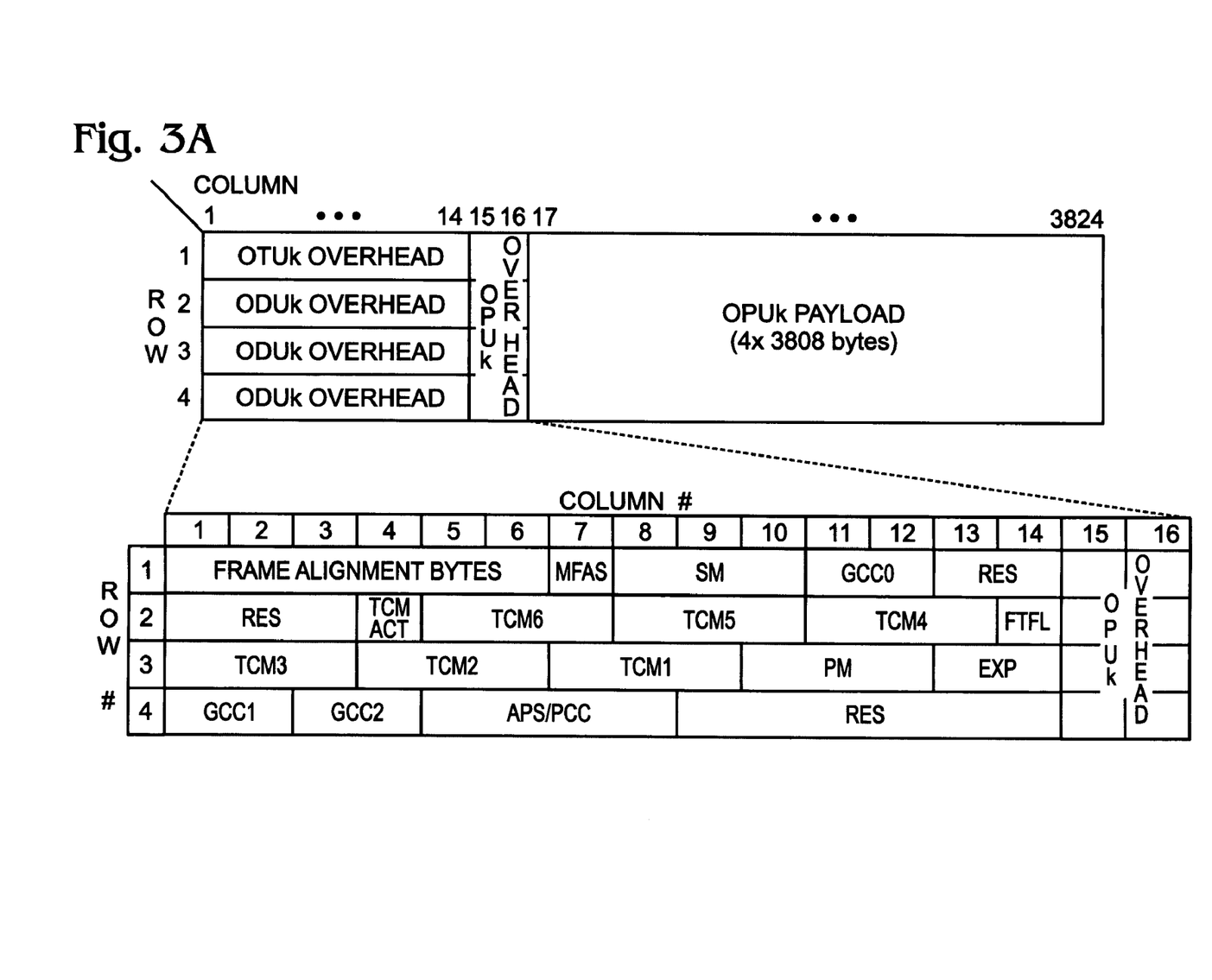
FIGS. 3A through 3B are diagrams illustrating the G.709 optical channel transport unit (OTU) frame structure.
Figure 3B:
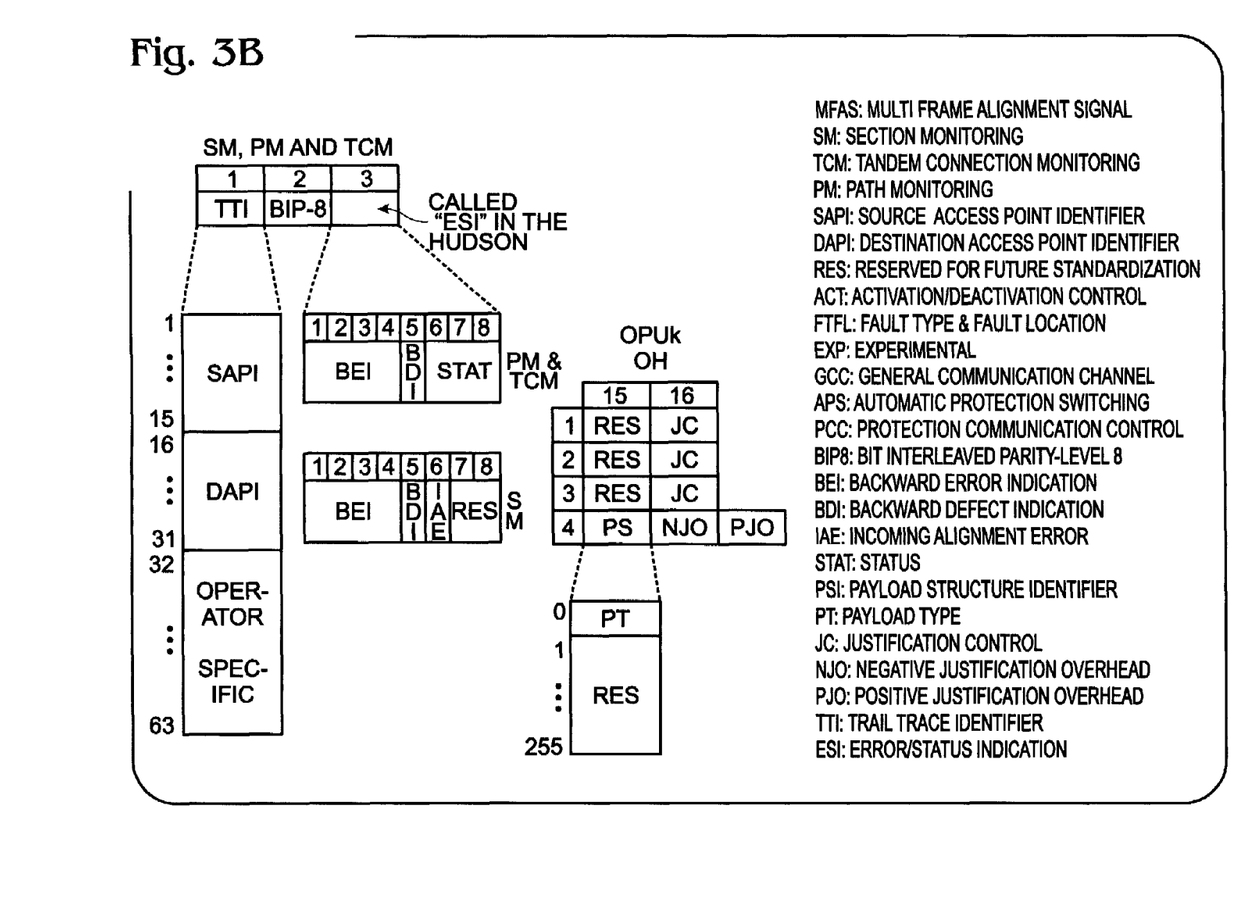

FIGS. 3A through 3C are diagrams illustrating the G.709 optical channel transport unit (OTU) frame structure. In a G.709 compliant system, it is normal to provide read access to all 64 of the G.709 overhead bytes by dropping them to the user interface during each frame. Some of these 64 overhead bytes contain the received backward fields. Instead of providing access to the unneeded received backward fields, the receiving integrated circuit provides access to the calculated backward fields instead by overwriting the received backward fields with the calculated backward fields that should be sent upstream. Then, a simple buffer circuit such as a field programmable gate array (FPGA) can be used to transfer these backward fields from one integrated circuit to the other, immediately, and without software intervention.

Backwards messages are used to determine the health of the system at a variety of levels, such as node-to-node, carrier-to-carrier, and end-to-end Monitoring bytes have been established for all these levels. There are six tandem connection monitoring (TCM) bytes, a path monitoring byte (PM), and a section monitoring (SM) byte. It is possible that none, one, or more than one of these bytes could be of interest to any particular processor. Each byte typically includes fields for a trail trace identifier (TTI), bit interleaved parity (BIP-8), backward defect indication (BDI), backward error indication (BEI), and status bits. The present information is concerned with transporting backward information such as the BDI and BEI portions of the TCM, PM, and SM bytes that must be supplied for upstream messages every frame.

The simplex processor receives messages in a frame format with a payload and an overhead section, such as the G.709 format of FIG. 3, and drops the overhead section. The simplex processor selectively reads backward message monitor bytes in the dropped overhead section to determine if upstream communication nodes (not shown) are receiving transmitted messages. The processor may collect statistics and/or set alarms in response to this received backward information. This information is useful in maintaining the upstream processing equipment.

The simplex processor also determines errors in the downstream messages, expresses the errors in the form of transmit overhead bytes, and selectively overwrites the backward message monitor bytes in the overhead section (which it has already read) with transmit monitor overhead bytes.

Returning to FIG. 2, the simplex processor 202 has an output on line 220 to provide write timing signals. The buffer 216 is written with the transmit monitor overhead bytes on line 206 in response to the write timing signals from the simplex processor on line 220. The transmit overhead bytes are read from the buffer 216 using read timing signals on line 222 responsive to the upstream messages.

As mentioned above, typically only a handful of transmit monitor overhead bytes are of interest. However, these bytes are supplied to the buffer 216 in response to every received frame (downstream). Likewise, the transmit monitor overhead bytes must be read into every frame transmitted upstream. That is, the simplex processor 202 writes a first set of transmit monitor overhead bytes from a first received frame into the buffer 216, and then overwrites the first set of transmit overhead bytes with a second set of transmit overhead bytes from a second frame following the first frame. The first set of transmit overhead bytes are read from the buffer 216 into a first transmit frame before they are overwritten by the second set of transmit overhead bytes.

As mentioned above, when the simplex processor 202 receives a G.709 format message with 64 overhead bytes per frame, then the tandem connection monitoring (TCM), path monitoring (PM), and section monitoring (SM) overhead bytes are potentially read (not all the bytes are necessarily of interest). Then the simplex processor selectively overwrites at least one backward overhead byte in the TCM, PM, and SM overhead bytes and writes them to the buffer 216.

The system 200 is perhaps better appreciated in the context of a network of connected simplex devices. Then, a second simplex processor 240 must be introduced. The second simplex processor 240 has an input connected to the buffer output on line 218 for accepting the calculated overhead bytes, and an output on line 242 for supplying transmit message overhead bytes with the calculated overhead bytes. Again the second processor 240 typically includes a decoder 244 and an encoder 246.

The second simplex processor 240 has an output on line 222 to supply read timing signals. The transmit overhead bytes are read from the buffer 216 in response to read timing signals from the second simplex device 240.

Although the transmit monitor overhead bytes are supplied by the first simplex processor 202 every received frame, and the transmit monitor overhead bytes are transmitted by the second simplex processor 240 every transmit frame, the buffer 216 relieves the system 200 from the requirement that the two processors be synchronized or operated from the same clock. Thus, the first simplex processor 202 writes a first set of transmit monitor overhead bytes from a first received frame into the buffer 216, and overwrites the first set of transmit overhead bytes with a second set of transmit overhead bytes from a second frame following the first frame. The second simplex device 240 reads the first set of transmit overhead bytes from the buffer 216 into a first transmit frame before they are overwritten by the second set of transmit overhead bytes.

FIG. 2 also illustrates a system where the buffer 216 (or two buffers) is used to additionally transport backward information from the second simplex processor 240 to the first simplex process 202. The second simplex processor 240 supplies transmit monitor overhead bytes to the buffer 216. These transmit monitor overhead bytes are read by the first processor 202 and transmitted with the message on line 214.

Figure 4:
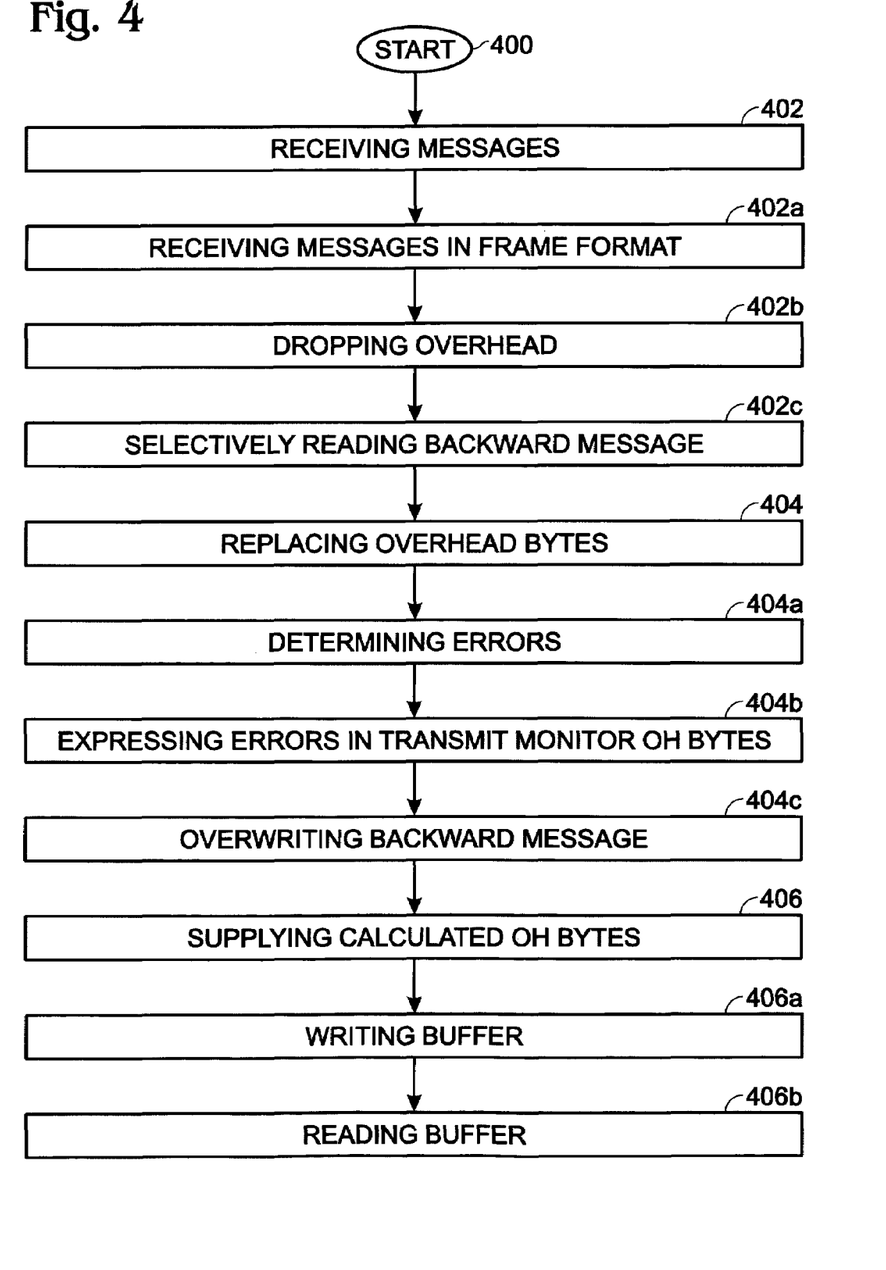
FIG. 4 is a flowchart illustrating the present invention method for transporting backward information in a digital wrapper format network.

FIG. 4 is a flowchart illustrating the present invention method for transporting backward information in a digital wrapper format network. Although the method (and the method of FIG. 5 below) is depicted as a sequence of steps for clarity, no order should be inferred from the numbering unless explicitly stated. The method starts at Step 400. Step 402 receives downstream messages with overhead bytes. Step 404 selectively replaces overhead bytes with calculated overhead bytes. Step 406 supplies the calculated overhead bytes for upstream messages.

In some aspects of the method, receiving downstream messages with overhead bytes in Step 402 includes substeps. Step 402a receives messages in a frame format with a payload and an overhead section. Step 402b drops the overhead section. Step 402c selectively reads backward message monitor bytes in the dropped overhead section. Step 402d (not shown) determines if upstream communication nodes are receiving transmitted messages.

In some aspects, selectively replacing overhead bytes with calculated overhead bytes in Step 404 includes substeps. Step 404a determines errors in the downstream messages. Step 404b expresses the errors in the form of transmit overhead (OH) bytes. Step 404c selectively overwrites at least one backward byte in the backward message monitor bytes in the overhead section with transmit monitor overhead bytes.

In some aspects of the method, supplying the calculated overhead bytes for upstream messages in Step 406 includes substeps. Step 406a writes a buffer with the transmit monitor overhead bytes using write timing signals responsive to the downstream messages. Step 406b reads the transmit overhead bytes into an upstream message from the buffer using read timing signals responsive to the upstream messages.

Writing a buffer with the transmit monitor overhead bytes using write timing signals responsive to the downstream messages in Step 406a includes writing a first set of transmit monitor overhead bytes from a first received frame, and overwriting the first set of transmit overhead bytes with a second set of transmit overhead bytes from a second frame following the first frame. Then, reading the transmit overhead bytes into an upstream message from the buffer using read timing signals responsive to the upstream messages in Step 406b includes reading the first set of transmit overhead bytes into a first transmit frame before they are overwritten by the second set of transmit overhead bytes.

In some aspects of the method, receiving messages in a frame format with an overhead section in Step 402 includes receiving a G.709 format message with 64 overhead bytes per frame. Selectively reading backward message monitor bytes in the dropped overhead section in Step 402c includes reading tandem connection monitoring (TCM), path monitoring (PM), and section monitoring (SM) overhead bytes (not all these bytes need be read). Then, selectively overwriting at least one backward byte in the backward message monitor bytes with transmit monitor overhead bytes in Step 404c includes selectively overwriting at least one backward overhead byte in the TCM, PM, and SM overhead bytes.

Figure 5:
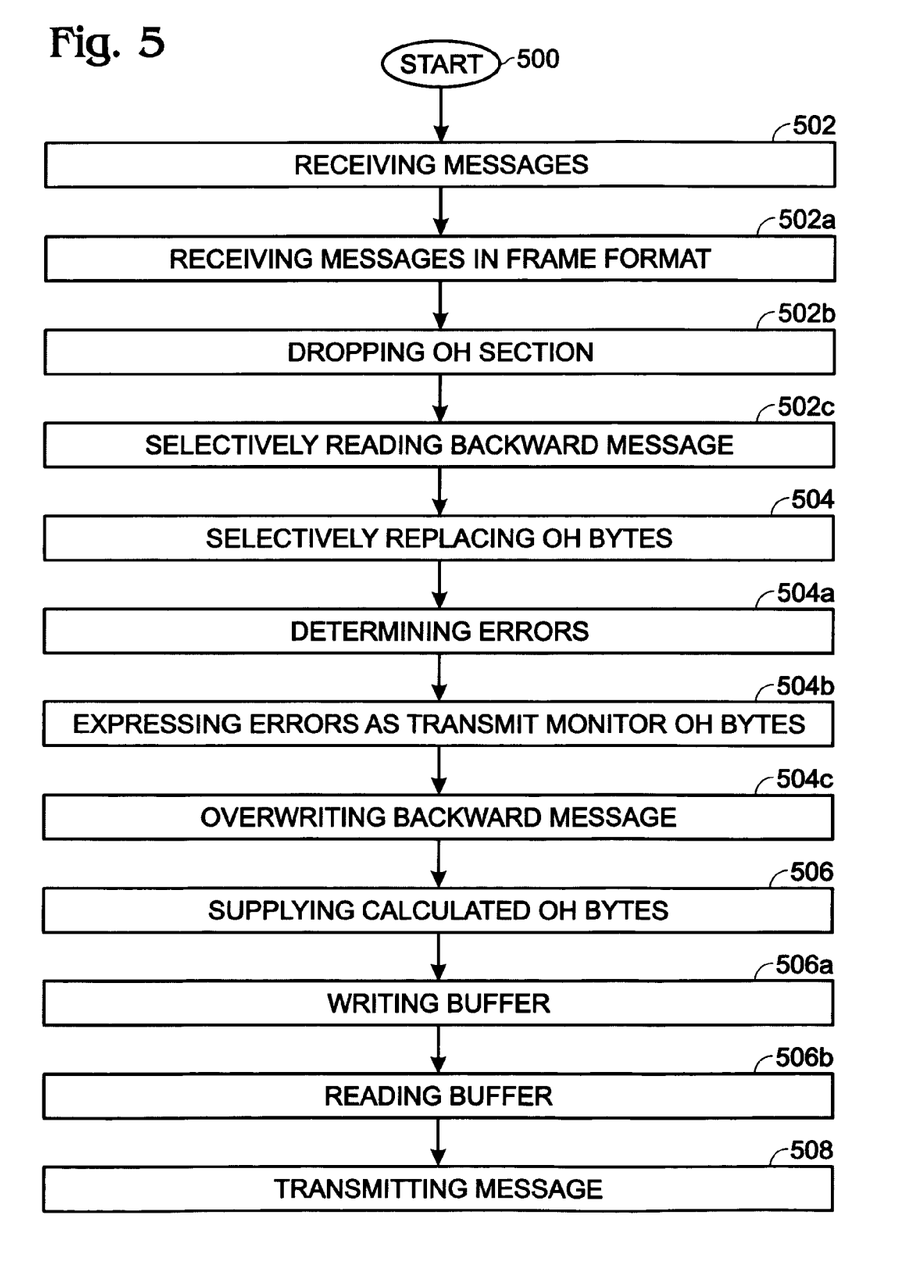
FIG. 5 is a flowchart illustrating the present invention method for transporting backward information in a digital wrapper format network of connected simplex devices.

FIG. 5 is a flowchart illustrating the present invention method for transporting backward information in a digital wrapper format network of connected simplex devices. The method starts at Step 500. Step 502 receives downstream messages with overhead bytes at a first simplex device. Step 504 selectively replaces overhead bytes with calculated overhead bytes. Step 506 supplies the calculated overhead bytes to a second simplex device for upstream messages. Step 508 transmits upstream messages with the calculated overhead bytes by the second simplex device.

In some aspects of the method, receiving downstream messages with overhead bytes at the first device in Step 502 includes substeps. Step 502a receives messages in a frame format with a payload and an overhead section. Step 502b drops the overhead section. Step 502c selectively reads backward message monitor bytes in the dropped overhead section. Step 502d (not shown) determines if upstream communication nodes are receiving transmitted messages.

In some aspects, selectively replacing overhead bytes with calculated overhead bytes in Step 504 includes substeps. Step 504a determines errors in the downstream messages. Step 504b expresses the errors in the form of transmit overhead bytes. Step 504c selectively overwrites at least one backward overhead byte in the backward message monitor bytes with transmit monitor overhead bytes.

In some aspects of the method, supplying the calculated overhead bytes to a second simplex device for upstream messages in Step 506 includes substeps. Step 506a writes a buffer with the transmit monitor overhead bytes using write timing signals from the first simplex device. Step 506b reads the transmit monitor overhead bytes into an upstream message from the buffer using read timing signals from the second simplex device.

In some aspects, writing a buffer with the transmit monitor overhead bytes using write timing signals from the first simplex device in Step 506a includes writing a first set of transmit monitor overhead bytes from a first received frame, and overwriting the first set of transmit overhead bytes with a second set of transmit overhead bytes from a second frame following the first frame. Then, reading the transmit overhead bytes into an upstream message from the buffer using read timing signals from the second simplex device in Step 506b includes reading the first set of transmit overhead bytes into a first transmit frame before they are overwritten by the second set of transmit overhead bytes.

In some aspects of the method, receiving messages in a frame format with an overhead section in Step 502 includes receiving a G.709 format message with 64 overhead bytes per frame. Selectively reading backward message monitor bytes in the dropped overhead section in Step 502c includes reading tandem connection monitoring (TCM), path monitoring (PM), and section monitoring (SM) overhead bytes. Then, selectively overwriting at least one backward overhead byte in the backward message monitor bytes with transmit monitor overhead bytes in Step 504c includes selectively overwriting the TCM, PM, and SM overhead bytes.

A system and method have been provided for the transport of backward information between two simplex devices communicating digital wrapper format communications. Specific examples have been given for the invention in the context of the G.709 standard and the use of TCM, PM, and SM monitoring bytes. However, the invention has broader applications. Other variations and embodiments of the invention will occur to those skilled in the art.

I claim:

1. In a digital wrapper format network, a method for transporting backward information, the method comprising:
   receiving downstream messages with payload and overhead bytes as follows:
      receiving messages in a frame format with an overhead section;
      dropping the overhead section;
      selectively reading backward message monitor bytes in the dropped overhead section; and,
      determining if an upstream communications node is receiving transmitted messages;
   selectively replacing overhead bytes with calculated overhead bytes as follows:
      determining errors in the downstream messages
      expressing the errors in the form of transmit overhead bytes; and,
      selectively overwriting at least one backward overhead byte in the backward message monitor bytes of the overhead section with transmit monitor overhead bytes; and,
   supplying the calculated overhead bytes for upstream messages as follows:
      writing a buffer with the transmit monitor overhead bytes using write timing signals responsive to the downstream messages; and,
      reading the transmit overhead bytes into an upstream message from the buffer using read timing signals responsive to the upstream messages;
   wherein writing a buffer with the transmit monitor overhead bytes using write timing signals responsive to the downstream messages includes writing a first set of transmit monitor overhead bytes from a first received frame, and overwriting the first set of transmit overhead bytes with a second set of transmit overhead bytes from a second frame following the first frame; and,
   wherein reading the transmit overhead bytes into an upstream message from the buffer using read timing signals responsive to the upstream messages includes reading the first set of transmit overhead bytes into a first transmit frame before they are overwritten by the second set of transmit overhead bytes.

2. The method of claim 1 wherein receiving messages in a frame format with an overhead section includes receiving a G.709 format message with 64 overhead bytes per frame;
   wherein selectively reading backward message monitor bytes in the dropped overhead section includes reading tandem connection monitoring (TCM), path monitoring (PM), and section monitoring (SM) overhead bytes; and,
   wherein selectively overwriting at least one backward overhead byte in the backward message monitor bytes with transmit monitor overhead bytes includes selectively overwriting the TCM, PM, and SM overhead bytes.

3. In a digital wrapper format network of connected simplex devices, a method for transporting backward information, the method comprising:
   receiving downstream messages with overhead bytes at a first simplex device as follows:
      receiving messages in a frame format with a payload and an overhead section;
      dropping the overhead section;
      selectively reading backward message monitor bytes in the dropped overhead section; and,
      determining if upstream communication nodes are receiving transmitted messages;
   selectively replacing overhead bytes with calculated overhead bytes as follows:
      determining errors in the downstream messages;
      expressing the errors in the form of transmit overhead bytes; and,
      selectively overwriting at least one backward overhead byte in the backward message monitor bytes of the overhead section with transmit monitor overhead bytes;
   supplying the calculated overhead bytes to a second simplex device for upstream messages as follows:
      writing a buffer with the transmit monitor overhead bytes using write timing signals from the first simplex device; and,
      reading the transmit monitor overhead bytes into an upstream message from the buffer using read timing signals from the second simplex device; and,
   transmitting upstream messages with the calculated overhead bytes by the second simplex device.

4. The method of claim 3 wherein writing a buffer with the transmit monitor overhead bytes using write timing signals from the first simplex device includes writing a first set of transmit monitor overhead bytes from a first received frame, and overwriting the first set of transmit overhead bytes with a second set of transmit overhead bytes from a second frame following the first frame; and,
   wherein reading the transmit overhead bytes into an upstream message from the buffer using read timing signals from the second simplex device includes reading the first set of transmit overhead bytes into a first transmit frame before they are overwritten by the second set of transmit overhead bytes.

5. The method of claim 4 wherein receiving messages in a frame format with an overhead section includes receiving a G.709 format message with 64 overhead bytes per frame;
   wherein selectively reading backward message monitor bytes in the dropped overhead section to determine errors in the upstream messages includes reading tandem connection monitoring (TCM), path monitoring (PM), and section monitoring (SM) overhead bytes; and,
   wherein selectively overwriting at least one backward overhead byte in the backward message monitor bytes with transmit monitor overhead bytes includes selectively overwriting the TCM, PM, and SM overhead bytes.

6. In a digital wrapper format network, a system for transporting backward information, the system comprising:
   a simplex processor having an input for receiving downstream messages with overhead bytes, the simplex processor selectively replacing overhead bytes with calculated overhead bytes, supplying the calculated overhead bytes at an output, and providing write timing signals at an output;
   a buffer having an input for receiving the calculated overhead bytes and an output for supplying the calculated overhead bytes for upstream messages;
   wherein the simplex processor receives messages in a frame format with a payload and an overhead section, drops the overhead section, and selectively reads backward message monitor bytes in the dropped overhead section to determine if upstream communication nodes are receiving transmitted messages;

wherein the simplex processor determines errors in the downstream messages, expresses the errors in the form of transmit overhead bytes, and selectively overwrites at least one backward overhead byte in the backward message monitor bytes in the overhead section with transmit monitor overhead bytes; and, wherein the buffer is written with the transmit monitor overhead bytes in response to the write timing signals from the simplex processor, and the transmit overhead bytes are read from the buffer using read timing signals responsive to the upstream messages.

7. The system of claim 6 wherein the simplex processor writes a first set of transmit monitor overhead bytes from a first received frame into the buffer, and overwrites the first set of transmit overhead bytes with a second set of transmit overhead bytes from a second frame following the first frame; and, wherein the first set of transmit overhead bytes are read from the buffer into a first transmit frame before they are overwritten by the second set of transmit overhead bytes.

8. The system of claim 7 wherein the simplex processor receives a G.709 format message with 64 overhead bytes per frame, reads tandem connection monitoring (TCM), path monitoring (PM), and section monitoring (SM) overhead bytes, and selectively overwrites the TCM, PM, and SM overhead bytes.

9. In a digital wrapper format network of connected simplex devices, a system for transporting backward information, the system comprising:

a first simplex processor having an input for receiving downstream messages with overhead bytes, the first simplex processor selectively replacing overhead bytes with calculated overhead bytes, supplying the calculated overhead bytes at an output, and supplying write timing signals at an output;

a buffer having an input for receiving the calculated overhead bytes from the first simplex processor and an output for supplying the calculated overhead bytes;

a second simplex processor having an input to accept the calculated overhead bytes from the buffer, an output to supply an upstream message including the calculated overhead bytes, and an output to supply read timing signals;

wherein the first simplex processor receives messages in a frame format with a payload and an overhead section, drops the overhead section, and selectively reads backward message monitor bytes in the dropped overhead section to determine if upstream communication nodes are receiving transmitted messages;

wherein the first simplex processor determines errors in the downstream messages, expresses the errors in the form of transmit overhead bytes, and selectively overwrites at least one backward overhead byte in the backward message monitor bytes in the overhead section with transmit monitor overhead bytes; and, wherein the buffer is written with the transmit monitor overhead bytes in response to write timing signals from the first simplex processor, and the transmit overhead bytes are read from the buffer in response to read timing signals from the second simplex device.

10. The system of claim 9 wherein the first simplex processor writes a first set of transmit monitor overhead bytes from a first received frame into the buffer, and overwrites the first set of transmit overhead bytes with a second set of transmit overhead bytes from a second frame following the first frame; and, wherein the second simplex device reads the first set of transmit overhead bytes from the buffer into a first transmit frame before they are overwritten by the second set of transmit overhead bytes.

11. The system of claim 10 wherein the first simplex processor receives a G.709 format message with 64 overhead bytes per frame, reads tandem connection monitoring (TCM), path monitoring (PM), and section monitoring (SM) overhead bytes, and selectively overwrites the TCM, PM, and SM overhead bytes; and, wherein the second simplex processor supplies a G.709 upstream message with selectively overwritten TCM, PM, and SM overhead bytes.

* * * * *